United States Patent Office 3,269,983
Patented August 30, 1966

3,269,983
SOLVENTLESS SILICONE RESINS
George W. Holbrook, Midland, Mich., assignor to Dow Corning Corporation, Midland, Mich., a corporation of Michigan
No Drawing. Filed Aug. 14, 1964, Ser. No. 389,769
13 Claims. (Cl. 260—46.5)

This invention relates to a new solventless silicone polymer.

An object of the present invention is to provide silicone polymers which do not require a solvent either during the preparation or when used. Another object is to provide silicone polymers which can have their physical and chemical properties predetermined by design. Unlike prior art silicone polymers in which the chemical and physical properties are happenstance, and in which the silicone polymers have properties dependent upon the nature of the preparation, the properties of the present silicone polymers are virtually independent of the nature of the preparation and are dependent upon the structural arrangement which can readily be regulated.

Another object of this invention is to provide essentially transparent silicone polymers. Other objects and advantages will become apparent from the following description and appended claims.

The present invention provides a silicone polymer of the general formula

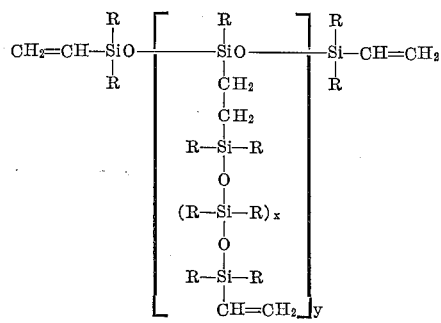

wherein R is a monovalent organic radical selected from the group consisting of alkyl radicals, aryl radicals, cycloalkyl radicals and $R_fCH_2CH_2-$ radicals where $R_f$ is a perfluoroalkyl group having from 1 to 10 carbon atoms, $x$ has an average value of at least 3 and $y$ has an average value of at least 3.

The monovalent organic radicals, R, can be alkyl radicals such as methyl, ethyl, propyl, butyl, isobutyl and octadecyl radicals; aryl radicals such as phenyl, naphthyl, xylyl, xenyl and β-phenylethyl radicals; cycloalkyl radicals such as cyclohexyl and cyclopentyl radicals, or radicals of the formula $R_fCH_2CH_2-$ wherein $R_f$ is a perfluoroalkyl radical having from 1 to 10 carbon atoms, such as $CF_3CH_2CH_2-$, $CF_3CF_2CH_2CH_2-$, $CF_3(CF_2)_9CH_2CH_2-$ and

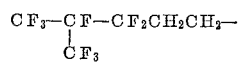

The silicone polymer of this invention as described by the above formula contains at least three siloxane units of the unit formula $R_2SiO$, therefore $x$ has an average value of at least 3. Only the ability to handle the polymer during the preparation and when used will determine the upper limit of $x$. The value of $x$ can be 5,000 or more. Preferably, $x$ has an average value from 3 to 500.

The silicone polymer as described above also contains at least three siloxane units of the unit formula

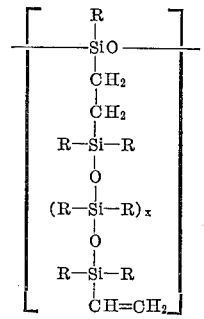

therefore $y$ has an average value of at least 3. The maximum value of $y$ can be 5,000 or more. Preferably, $y$ has an average value from 3 to 500.

The most preferred silicone polymers of this invention which have excellent solvent resistance are polymers of the formula

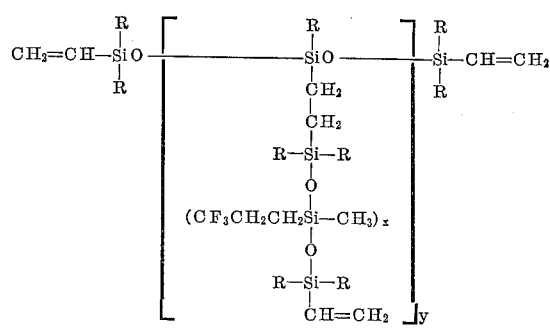

wherein R is defined above and is preferably methyl, $x$ has an average value of at least 3 and $y$ has an average value of at least 3. The most preferred average value of $x$ is from 3 to 50 and the most preferred average value of $y$ is from 3 to 100.

The silicone polymers of the present invention can be prepared by adding a hydrolyzable siloxane polymer of the general formula

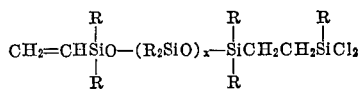

wherein R and x are described above, to a solution of a water soluble basic material and water. The basic material is such that the pH of the solution is maintained between 7 and 11 during the hydrolysis and during the subsequent conditioning and aging steps as described below. The basic aqueous solution is vigorously agitated during the addition of the hydrolyzable silicone polymer. The presence of organic solvents in the reaction mixture enhance cyclization of the reactants, therefore, no organic solvents should be present during this reaction step. The temperature of the hydrolysis step is not critical and can vary over a wide range such as from 0° C. to the reflux temperature of the reaction mixture. Higher temperatures provide higher molecular weight polymers. Conditioning as disclosed herein refers to the process in which the hydrolyzed molecules are condensed into short chain polymers usually of less than 6 units.

After the hydrolysis and conditioning steps the hydrolyzate can be aged by allowing it to remain at a pH between 7 and 11 over a period of time. The hydrolysis, conditioning and aging steps are usually conducted at higher temperatures, such as reflux temperature, especially when high molecular weights are desired. Reactions conducted at increasingly higher pH values also will enhance the growth of longer chain polymers in respective reactions. When the low molecular weight polymers are desired the aging step can be eliminated. The length of time the polymer is refluxed determines the value of y. The longer the material is refluxed, the higher the value of y. The product at this pont is a silanol endblocked polymer of the general formula

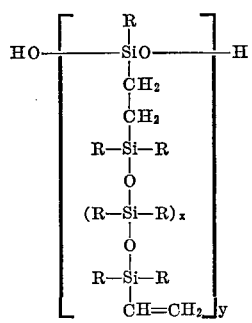

The above method for the preparation of the silanol endblocked polymers of this invention is more fully described in application Serial No. 341,095, filed January 29, 1964, by Eric D. Brown, which is hereby fully incorporated by reference.

Any basic material is operable which will produce an aqueous solution with a pH between 7 and 11, such as ammonium carbonate, sodium bicarbonate, sodium borate, ammonium bicarbonate and ammonium hydroxide.

Before the hydroxyl-endblocked polymer is endblocked with a triorganosilyl group, the reaction mixture must be completely neutralized. The reacton mixture can be neutralized by any conventional means, such as dilute HCl. The reaction mixture is washed with water after neutralization. The presence of basic materials, such as alkali metal ion will inhibit the endblocking reaction.

The hydroxyl-endblocked polymer can be endblocked with

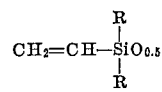

by refluxing the polymer in an organic solvent solution such as diethyl ether or cyclohexane with

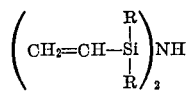

and a catalyst such as $CF_3COOH$, ammonium chloride, hydrogen chloride, sulfuric acid, ammonium sulfate, ammonium acetate, and acetic acid. The amount of catalyst required is from about 0.05 weight percent to about 2 weight percent based on the total weight of the solution. Preferably, 0.1 to 0.5 weight percent is used. A catalyst need not be used as the reaction will proceed without a catalyst. Endblocking with the $(R_3Si)_2NH$ type compound is essential as this endblocking method will not cause siloxane bond rearrangement and is a quantitative reaction. Catalyst which can be used to enhance the reaction rate can be any acid or acid salt which will not produce rearrangement. After the endblocking is complete as indicated by the stoppage of ammonia gas evolution, the polymer is separated from the aqueous solution and is washed with a dilute acid solution to neutralize any remaining basic material or with water alone to remove the water soluble by-products or both. Although the endblocking reaction need not be refluxed, it is preferred as the rate of reaction is faster. The polymer can also be filtered and if a solvent was used, vacuum and heat can be used to remove the solvent.

The hydrolyzable silicone polymers used to make the solventless silicone polymers are new. These hydrolyzable silicone polymers are prepared by adding $RHSiCl_2$ dropwise to a mixture of

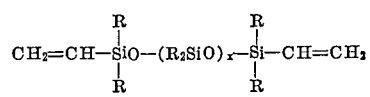

and $H_2PtCl_6$. The silicon-containing reactants must be in a 1 to 1 molar ratio. Any excess of the chlorosilane $RHSiCl_2$ over the required amount will give the following hydrolyzable silicone polymer

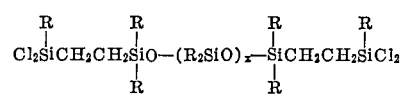

The vinyl-endblocked silicone polymers are known to the art and can be prepared by a method described in U.S. Patent No. 2,961,425. After the $RHSiCl_2$ has been added the mixture is heated. The mixture is heated to insure complete reaction and the temperature and time are not critical. The product is

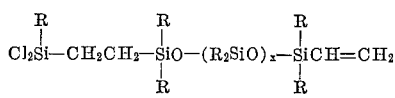

This is an unexpected product as the addition occurs at one end only. Prior art teaches that there should be a statistical distribution with addition to both ends. These hydrolyzable silicone polymers are unique as they can be used to prepare polymers with properties ranging from soft gels to resins to elastomers. These hydrolyzable silicone polymers are the basis for the solventless silicone polymers. These polymers have properties which can be tailor made for a particular use. As the value of $x$ increases the cured polymer becomes tougher. As the values of $y$ and $x$ increase the cured polymer becomes more elastic. The values of $x$ and $y$ can be varied to obtain almost any desired property in the final cured polymer.

The hydrolyzable silicone polymers of the formula

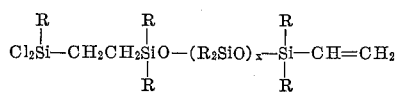

can be cohydrolyzed by the same hydrolysis procedure as described above with hydrolyzable silicone polymers of the formula

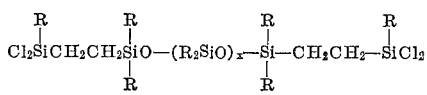

where R and $x$ are defined above. These can be copolymerized to form polymers with increased branching. After the two silicone polymers are hydrolyzed and condensed, the resulting product can be endblocked by the same procedure as described above. The copolymer consists essentially of the units of the unit formulae

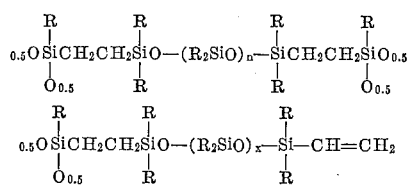

and

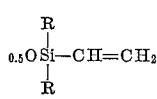

These copolymers preferably consist of at least 50 mole percent of units of the unit formula

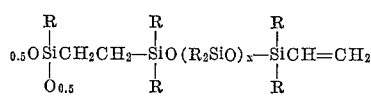

The silicone polymers of this invention can be cured by several methods. The silicone polymers can be cured by any conventional organic peroxide such as ditertiary butyl peroxide, acetylperoxide, tertiary-butyl perbenzoate, benzoyl peroxide, tertiary-butyl hydroperoxide, tertiary-butylperacetate, 2,5-bis(tertiary-butylperoxy)-2,5-dimethylhexane, cumylhydroperoxide, 2,4-dichlorobenzoyl peroxide, dicumylperoxide, and p-tertiary-butyl isopropylbenzenehydroperoxide.

Another curing method is to add to the silicone polymer of this invention an Si—H containing compound and then catalyze with a platinum catalyst such as $H_2PtCl_6$. Other platinum systems which can be used in curing the polymers of this invention can be found in U.S. Patent No. 2,823,218.

The cured solventless silicone polymers are resilient, transparent solids. The polymers can be used in place of conventional silicone polymers in areas where potting compounds, resins and elastomers are used. These polymers have outstanding optical properties and retain their strength at high temperatures, such as 250° C. The polymers have good solvent resistance, especially those containing high quantities of fluorinated alkyl radicals. These polymers are unaffected at room temperature over prolonged periods when left in contact with solvents such as perchloroethylene, chloroform, carbon tetrachloride, benzene, cyclohexane, and toluene.

The following examples are illustrative only and should not be construed as limiting the invention which is properly delineated in the appended claims.

Preparation of

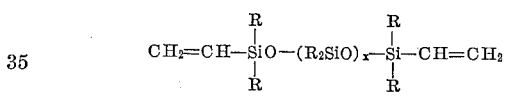

An example of a preparation of this type of starting material will be used to illustrate the method.

A mixture of 186 g. (1.0 mole, 100% excess) of tetramethyldivinyldisiloxane, 234 g. (0.5 mole) of

and 1.0 cc. of $HCF_2CF_2SO_3H$ was agitated at room temperature for two hours. The catalyst was removed by washing with aqueous $NaHCO_3$. After drying and removing the excess tetramethyldivinyldisiloxane fractionation gave

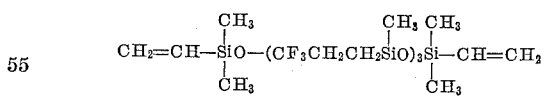

in nearly quantitative yield.

The value of $x$ can be increased by increasing the molar ratio of the cyclic trimer to the vinyl-endblocker.

*Example 1*

A mixture of 264 g. (0.4 mole) of

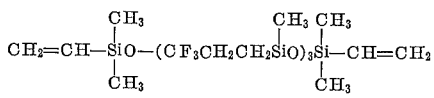

and four drops of $H_2PtCl_6$ solution containing 0.22 weight percent platinum based on the silicone polymers was heated to 110° C. 46 g. (0.4 mole) of $(CH_3)HSiCl_2$ was added dropwise to the heated solution. The heated solution was agitated. The reaction was exothermic. Following the addition the mixture was agitated and heated for one hour at 125° C. 192 g. of

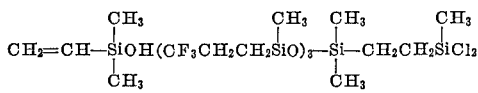

was obtained (74% yield).

*Example 2*

When one mole of the following vinyl-endblocked silicone polymer is reacted with one mole of the silanes respectively according to the procedure of Example 1, equivalent results are obtained.

under 0.1 mm. of Hg for one hour. The following product was obtained:

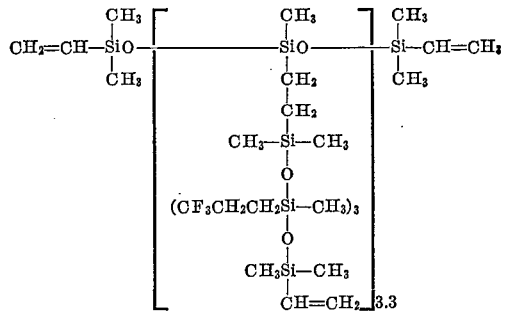

| | | |
|---|---|---|
| 1 | 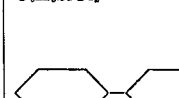 | H–C$_6$H$_5$SiCl$_2$ |
| 2 | 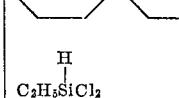 | H–(biphenyl)–SiCl$_2$ |
| 3 | 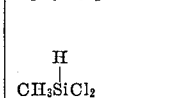 | H–C$_2$H$_5$SiCl$_2$ |
| 4 | 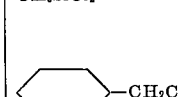 | H–CH$_3$SiCl$_2$ |
| 5 | 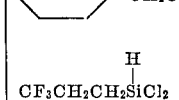 | H–(C$_6$H$_5$)–CH$_2$CH$_2$SiCl$_2$ |
| 6 | 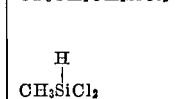 | H–CF$_3$CH$_2$CH$_2$SiCl$_2$ |
| 7 |  | H–CH$_3$SiCl$_2$ |

*Example 3*

With vigorous stirring, 38.5 g. (0.05 mole) of the product of Example 1 was added to a solution of 17.6 g. of sodium bicarbonate in 80 ml. of water. The mixture was conditioned and condensed by refluxing for one hour. Following the condensation, 9.25 g. (0.05 mole) of

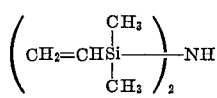

in a diethyl ether solution with four drops of CF$_3$COOH was mixed with the condensed product and refluxed in an ether solution. The product was washed with dilute aqueous HCl, followed by a wash with water. The solution was devolatilized, filtered and then held at 100° C.

*Example 4*

(A) Following the same procedure as Example 3 except by refluxing with aqueous sodium bicarbonate for four hours instead of one hour, the polymer increased from an average of 3.3 units to 5.7 units.

(B) Following the same procedure as Example 3 except that the condensation and conditioning was as follows: refluxed four hours with 10 weight percent ammonium hydroxide followed by 17 hours reflux with sodium carbonate, the polymer increased in length from 3.3 units to 30 units.

*Example 5*

When the procedure of Example 3 is followed and one mole of each of the following silicon-containing reactants are used and the following basic materials are used, the products obtained will have a structure such as the ones indicated by the product formulae which are representative structures. The length of the polymer chain will be determined upon the length of time the condensation is carried out.

| | Hydrolyzable silicone polymer | Silazane endblocker | Basic material | Product |
|---|---|---|---|---|
| 1 | $CH_2=CHSiO\left(\begin{array}{c}CH_3 \\ SiO \\ CH \end{array}\right.\begin{array}{c}CH_2CH_2(CF_2)_3CF_3 \\ \\ \end{array}\Big)_{30}\begin{array}{c}CH_3 \\ Si-CH_2CH_2SiCl_2 \\ CH_3 \end{array}$ | $\left(\begin{array}{c}C_6H_5 \\ CH_2=CH-Si-NH \\ CH_3\end{array}\right)_2$ | Sodium bicarbonate | $CH_2=CHSiO\begin{array}{c}C_6H_5 \\ \\ CH_3\end{array}\left[\begin{array}{c}CH_3 \\ SiO \\ CH_2 \\ CH_2 \\ [CF_3(CF_2)_3CH_2CH_2Si-CH_3]_{30} \\ CH_3 \\ Si-CH_3 \\ CH=CH_2 \end{array}\right]_{24}\begin{array}{c}C_6H_5 \\ SiCH=CH_2 \\ CH_3\end{array}$ |
| 2 | $CH_2=CHSiO\begin{array}{c}C_6H_5 \\ \\ CH_3\end{array}\left(\begin{array}{c}CH_3 \\ SiO \\ C_6H_{11}\end{array}\right)_{15}\begin{array}{c}C_6H_5 \\ SiCH_2CH_2SiCl_2 \\ CH_3\end{array}$ | $\left(\begin{array}{c}C_2H_5 \\ CH_2=CH-Si-NH \\ C_2H_5\end{array}\right)_2$ | Ammonium carbonate | $CH_2=CHSiO\begin{array}{c}C_2H_5 \\ \\ C_2H_5\end{array}\left[\begin{array}{c}C_6H_5 \\ SiO \\ CH_2 \\ CH_2 \\ CH_3-Si-C_6H_5 \\ (CH_3-Si-C_6H_{11})_{15} \\ C_6H_5-Si-CH_3 \\ CH=CH_2\end{array}\right]_{78}\begin{array}{c}C_2H_5 \\ Si-CH=CH_2 \\ C_2H_5\end{array}$ |
| 3 | $CH_2=CHSiO\begin{array}{c}CH_2CH_2CF_3 \\ \\ CH_2CH_2CF_3\end{array}\left(\begin{array}{c}CH_3 \\ SiO \\ CH_3\end{array}\right)_{100}\begin{array}{c}CH_2CH_2CF_3 \\ Si-CH_2CH_2-SiCl_2 \\ CH_2CH_2CF_3\end{array}\begin{array}{c}CH_3 \\ \\ CH_3\end{array}$ | $\left(\begin{array}{c}CH_3 \\ CH_2=CHSi-NH \\ CH_3\end{array}\right)_2$ | Ammonium hydroxide | $CH_2=CHSiO\begin{array}{c}CH_3 \\ \\ CH_3\end{array}\left[\begin{array}{c}CH_3 \\ SiO \\ CH_2 \\ CH_2 \\ CF_3CH_2CH_2Si-CH_2CH_2CF_3 \\ (CH_3-Si-CH_3)_{100} \\ CF_3CH_2CH_2Si-CH_2CH_2CF_3 \\ CH=CH_2\end{array}\right]_{120}\begin{array}{c}CH_3 \\ SiCH=CH_2 \\ CH_3\end{array}$ |

| | Hydrolyzable silicone polymer | Silazane endblocker | Basic material | Product |
|---|---|---|---|---|
| 4 | $CH_2{=}CHSiO{-}\underset{CH_3}{\overset{CH_3}{Si}O}{-}\underset{CH_3}{\overset{CH_3}{Si}}CH_2CH_2SiCl_2$ with $(CH_3)_{500}$ | $\left(CH_2{=}CHSi{-}\underset{CH_3}{\overset{CH_3}{\phantom{|}}}\right)_2 NH$ | Sodium borate | (complex siloxane product structure) |
| 5 | Fluorinated hydrolyzable silicone polymer with $CH_2CH_2CF_3$ groups | $\left(CH_2{=}CHSi{-}\underset{CH_2CH_2CF_3}{\overset{CH_2CH_2CF_3}{\phantom{|}}}\right)_2 NH$ | Ammonium bicarbonate | (complex fluorinated siloxane product structure) |
| 6 | Hydrolyzable silicone polymer with $(CH_3)_{5000}$ | $\left(CH_2{=}CHSi{-}\underset{CH_3}{\overset{CH_3}{\phantom{|}}}\right)_2 NH$ | Ammonium hydroxide | (complex siloxane product structure) |

Example 6

With vigorous agitation, 34.6 g. (0.045) mole) of

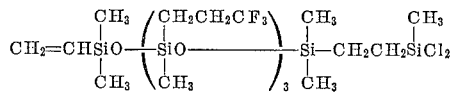

and 4.4 g. (0.005 mole)

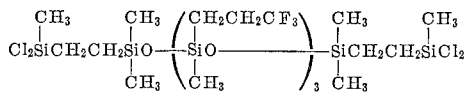

was added to a solution of 17.6 g. of sodium bicarbonate in 80 ml. of water. After the addition the mixture was agitated for two hours at reflux temperature. To this mixture 9.25 g. of

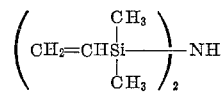

and 4 drops of $CF_3COOH$ was added in a diethyl ether solution and refluxed. The product was washed and devolatilized as in Example 3. The copolymer obtained contained units of

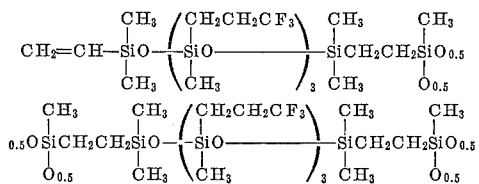

and

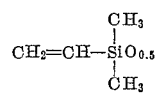

Example 7

(A) Eight grams of the product of Example 3 was mixed with 0.08 g. dietertiary butyl peroxide placed in a bottle sealed with a cap lined with polytetrafluoroethylene, and heated for 15 hours at 130° C. and then post cured for 2 hours at 250° C.

The cured product was resilient, transparent and had excellent optical properties. The cured product was unaffected when left in contact with toluene and chloroform.

(B) Five grams of the product of Example 3 was mixed with 1.157 g. of

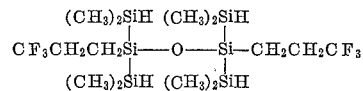

and 3 drops of chloroplatinic acid. The mixture cured to a product like that of Example 7(A) in 5 minutes at room temperature.

This invention anticipates the use of fillers and other additives which are conventionally used with silicone polymers. Examples of fillers are such as fume silica, silica aerogels, silica xerogels, titania, zinc oxide, ferric oxide, diatomaceous earth, crushed quartz, carbon black, conventional silicone resins, powdered polytetrafluoroethylene and fiber glass. The filler can be treated with organosilanes.

That which is claimed is:

1. A silicone polymer of the general formula

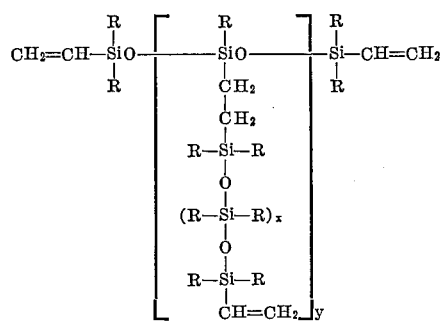

wherein R is a monovalent organic radical selected from the group consisting of alkyl radicals, aryl radicals, cycloalkyl radicals and $R_fCH_2CH_2$— radicals where $R_f$ is a perfluoroalkyl group having from 1 to 10 carbon atoms, $x$ has an average value of at least 3 and $y$ has an average value of at least 3.

2. The cured composition of claim 1.

3. A silicone polymer in accordance with claim 1 wherein R is a methyl radical.

4. A silicone polymer of the general formula

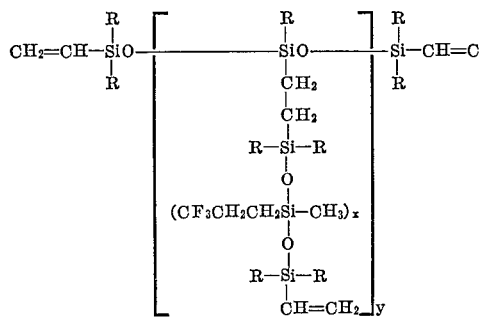

wherein R is a monovalent organic radical selected from the group consisting of alkyl radicals, aryl radicals, cycloalkyl radicals and $R_fCH_2CH_2$— radicals where $R_f$ is a perfluoroalkyl group having from 1 to 10 carbon atoms, $x$ has an average value of at least 3 and $y$ has an average value of at least 3.

5. A silicone polymer in accordance with claim 4 wherein R is a methyl radical, $x$ is 3 and $y$ is 3.

6. A silicone polymer in accordance with claim 4 wherein R is a methyl radical, $x$ has an average value from 3 to 50 and $y$ has an average value from 3 to 100.

7. A hydrolyzable silicone polymer of the general formula

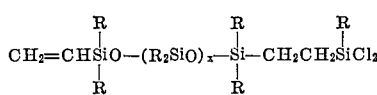

wherein R is a monovalent organic radical selected from the group consisting of alkyl radicals, aryl radicals, cycloalkyl radicals and $R_fCH_2CH_2$— radicals where $R_f$ is a perfluoroalkyl group having from 1 to 10 carbon atoms, and $x$ has an average value of at least 3.

8. A hydrolyzable silicone polymer of the formula

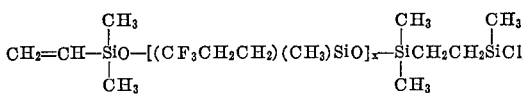

wherein $x$ has an average value of at least 3.

9. A hydrolyzable silicone polymer in accordance with claim 8 wherein $x$ has an average value of from 3 to 50.

10. A silicone copolymer consisting essentially of units of the unit formulae

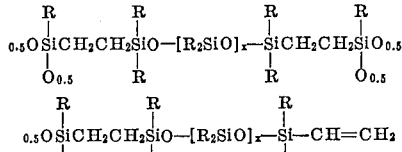

and

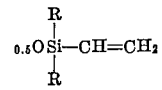

wherein R is a monovalent organic radical selected from the group consisting of alkyl radicals, aryl radicals, cycloalkyl radicals and $R_fCH_2CH_2$— radicals where $R_f$ is a perfluoroalkyl group having from 1 to 10 carbon atoms and $x$ has an average value of at least 3.

11. A method for preparing a silicone polymer comprising (1) hydrolyzing at least one hydrolyzable silicone polymer of the general formula

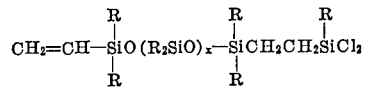

wherein R is a monovalent organic radical selected from the group consisting of alkyl radicals, aryl radicals, cycloalkyl radicals and $R_fCH_2CH_2$— radicals where $R_f$ is a perfluoroalkyl group having from 1 to 10 carbon atoms and $x$ has an average value of at least 3, by adding said polymer to a basic aqueous solution having a pH in the range of 7.0 to 11.0 with vigorous agitation during said addition, the reacting mixture being free of organic solvents, (2) aging the product from (1) in contact with the aqueous solution having a pH in the range of 7.0 to 11.0 until the hydroxyl endblocked polymer obtained reaches the desired degree of polymerization, (3) neutralizing the aged polymer from (2) to a pH of about 7.0 and washing said polymer with water, (4) mixing and reacting the neutralized and washed polymer from 3 with a siloxane of the formula

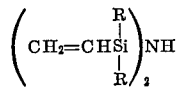

where R is as above defined, (5) neutralizing and washing the reaction product from (4) to a pH of about 7.0, and (6) separating the polymeric product from the aqueous system to obtain a silicone polymer of the general formula

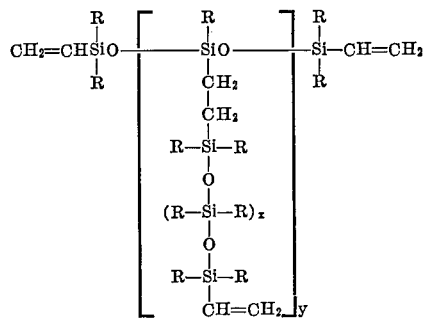

wherein R and $x$ are defined above, and $y$ has an average value of at least 3.

12. The method of claim 11 whereby a silicon copolymer consisting essentially of units of the unit formula

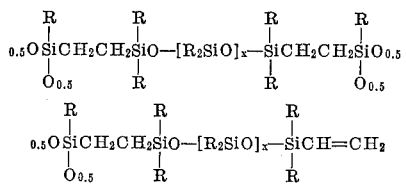

and

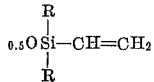

wherein R and x are defined above, is prepared by adding along with the hydrolyzable silicon polymer in (1), no more than 50 mol percent of another hydrolyzable silicone polymer of the general formula

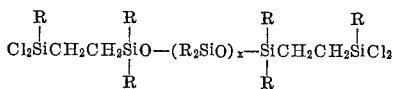

where R and x have been defined above based on the total moles of the two hydrolyzable silicone polymers.

13. A method for preparing a hydrolyzable silicone polymer comprising (1) adding a silane of the formula $RHSiCl_2$ where R is a monovalent organic radical selected from the group consisting of alkyl radicals, aryl radicals, cycloalkyl radicals, and $R_fCH_2CH_2—$ radicals where $R_f$ is a perfluoroalkyl group having from 1 to 10 carbon atoms dropwise to a mixture of a siloxane of the formula

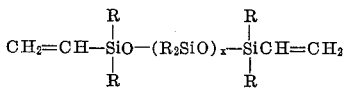

and a platinum catalyst where R is defined above, and x has an average value of at least 3, said silane and siloxane are in a 1:1 molar ratio, thereafter, (2) heating said mixture.

References Cited by the Examiner
FOREIGN PATENTS
651,680 11/1962 Canada.
863,722 3/1961 Great Britain.

LEON J. BERCOVITZ, *Primary Examiner.*
DONALD CZAJA, *Examiner.*
F. McKELVEY, *Assistant Examiner.*

UNITED STATES PATENT OFFICE
CERTIFICATE OF CORRECTION

Patent No. 3,269,983                            August 30, 1966

George W. Holbrook

It is hereby certified that error appears in the above numbered patent requiring correction and that the said Letters Patent should read as corrected below.

Column 5, lines 50 to 57, for that portion of the formula reading $-(R_2SiO)_n$          read          $-(R_2SiO)_x$ column 7, lines 5 to 9, for that portion of the formula reading $-\overset{|}{\underset{|}{Si}}OH$          read          $-\overset{|}{\underset{|}{Si}}O-$ column 8, lines 3 to 15, for the right-hand portion of the formula reading $\overset{|}{\underset{|}{Si}}-CH=CH_3$          read          $\overset{|}{\underset{|}{Si}}-CH=CH_2$ column 9, in the table, under the heading "Hydrolyzable silicone polymer", for the left-hand portion of the formula 1 reading $\overset{|}{CH}$          read          $\overset{|}{CH_3}$ column 14, line 1, for "(0.045)mole)" read -- (0.045 mole) --; column 16, line 46, for "siloxane" read -- silazane --; column 17, line 17, for "silicon" read -- silicone --.

Signed and sealed this 24th day of October 1967.

(SEAL)
Attest:

EDWARD M. FLETCHER, JR.                      EDWARD J. BRENNER
Attesting Officer                              Commissioner of Patents